Sept. 4, 1923.
J. W. H. SNELL
1,467,122
MACHINE FOR INSTALLING AND REMOVING TIRES FROM RIMS
Filed March 26, 1920    5 Sheets-Sheet 5
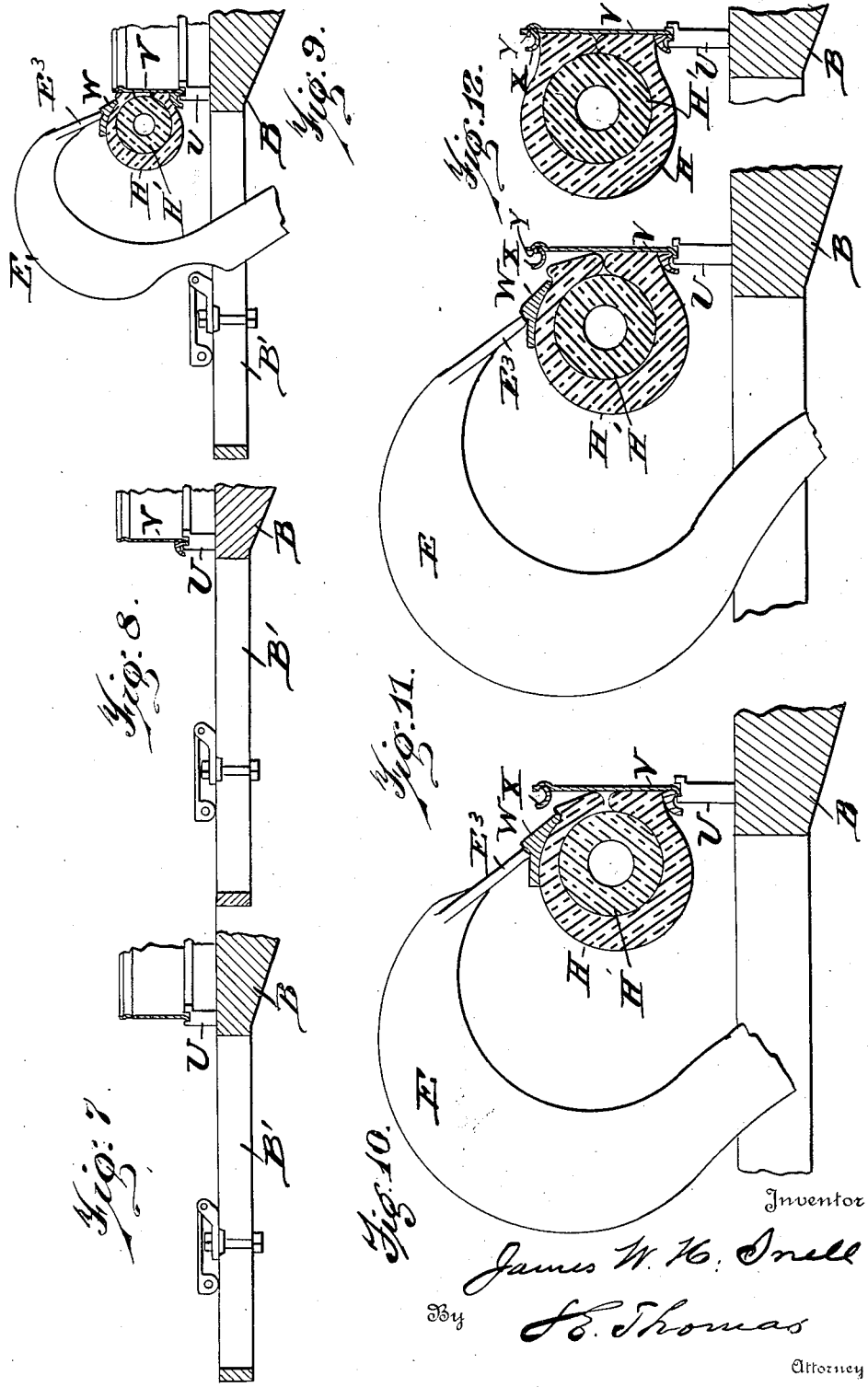
Inventor
James W. H. Snell
By  H. Thomas
Attorney Reissued Sept. 4, 1923.

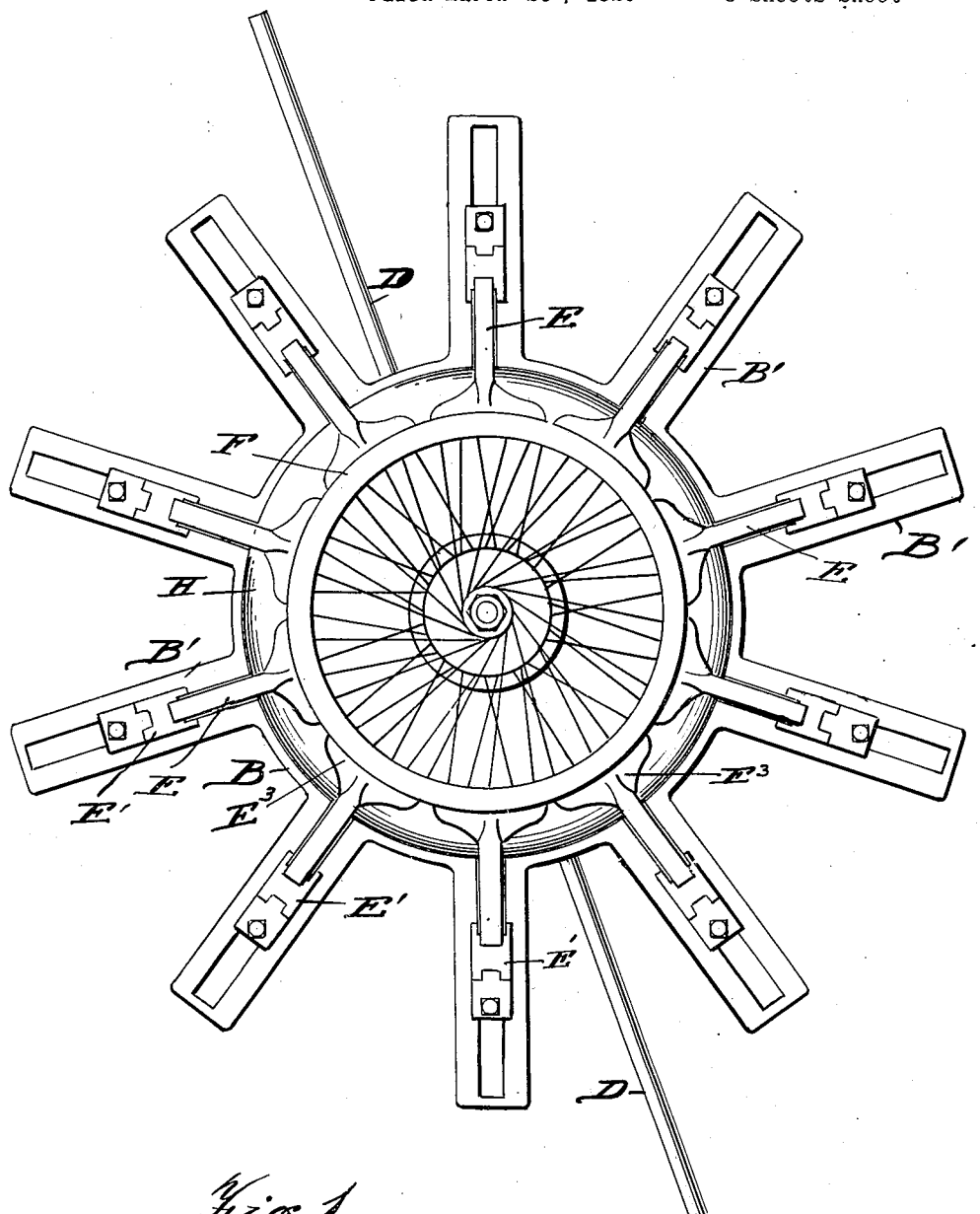

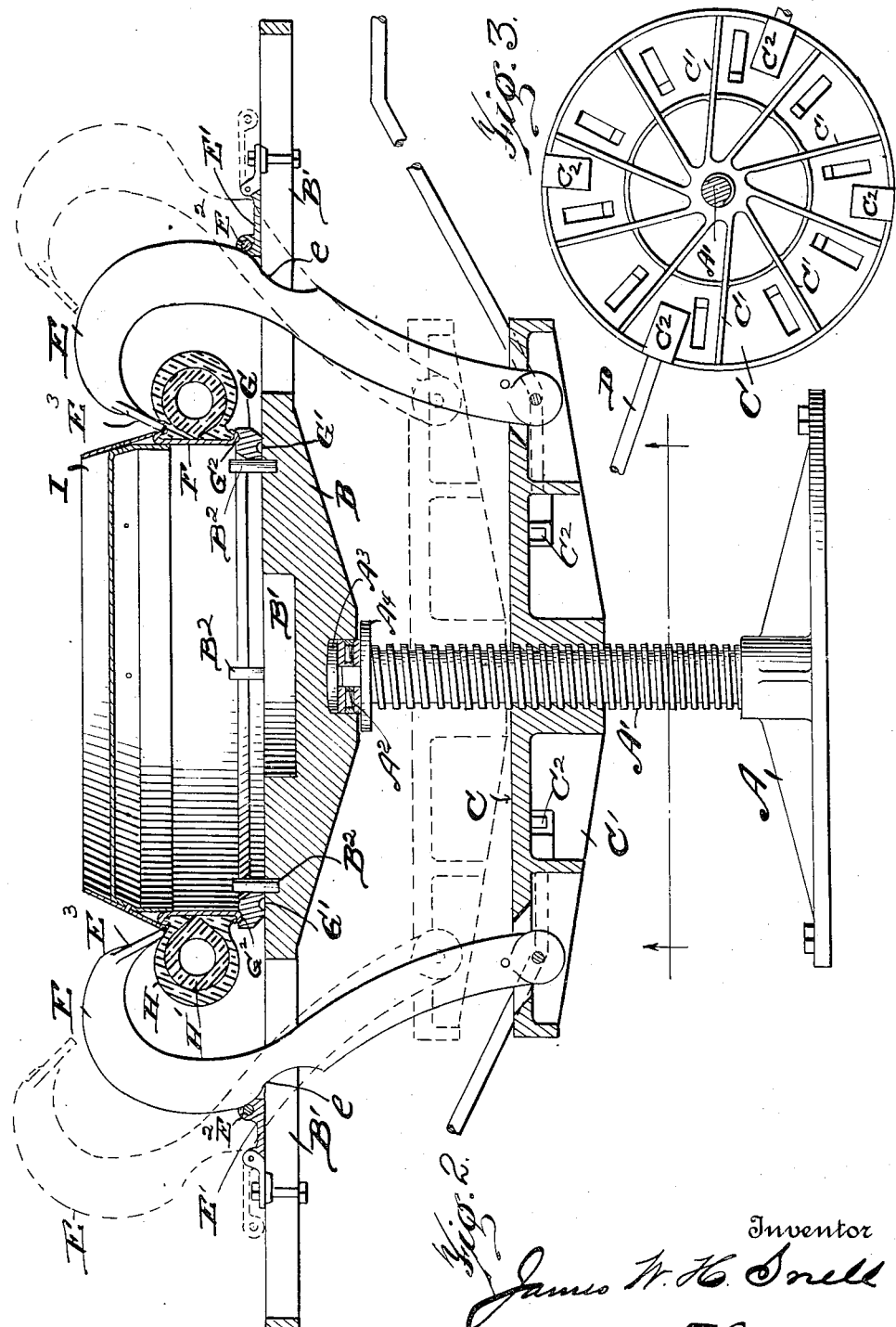

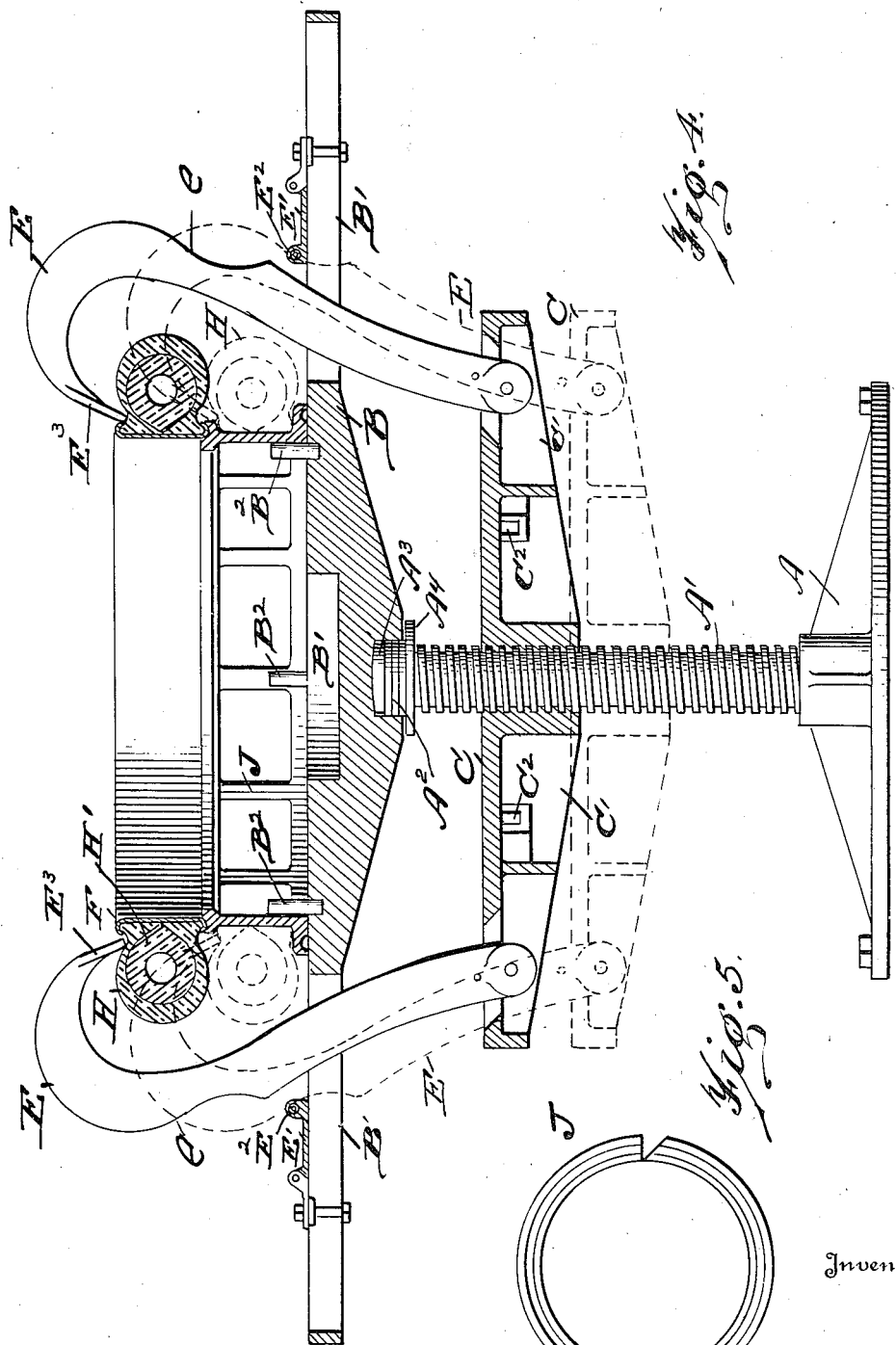

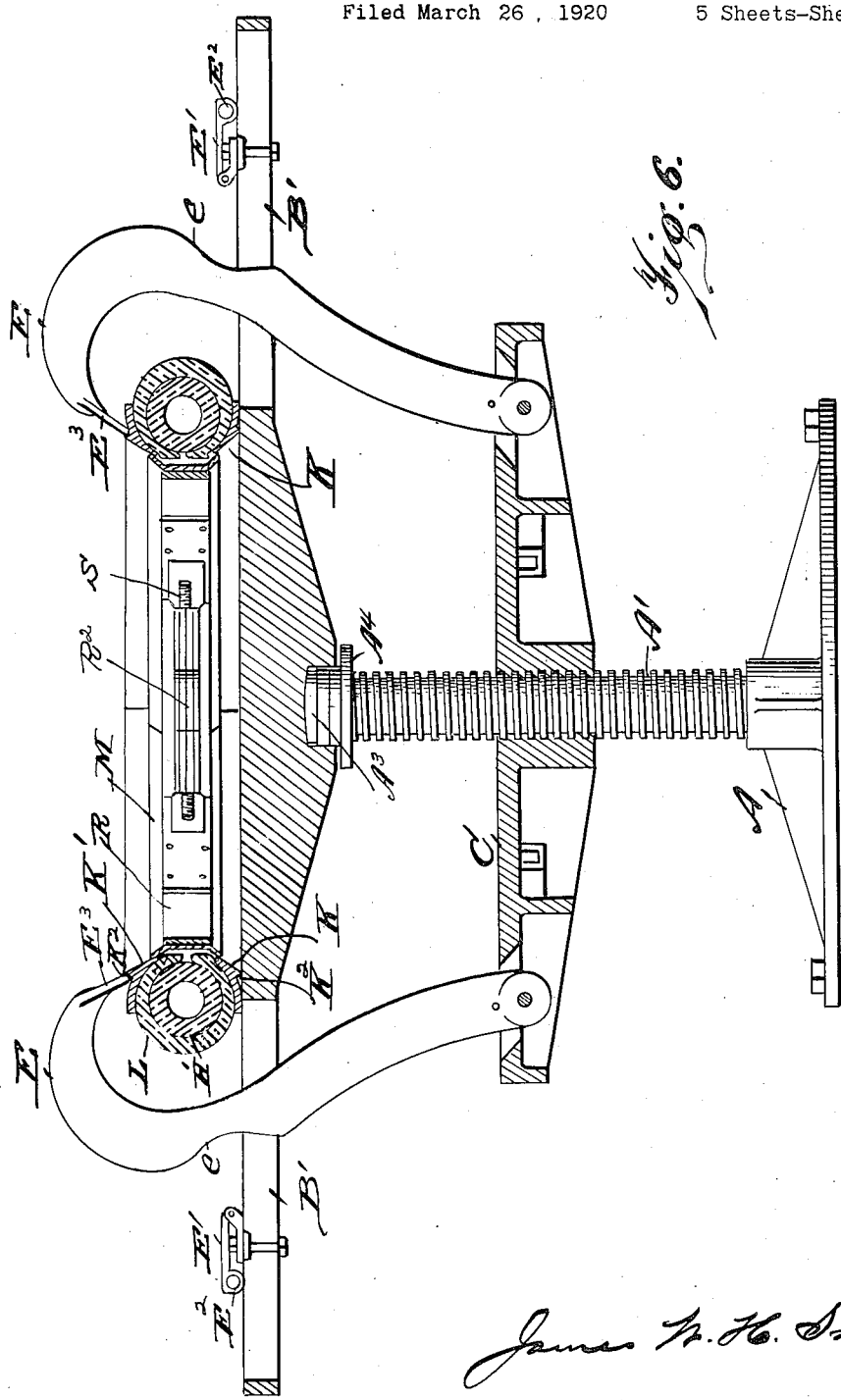

1,467,122

UNITED STATES PATENT OFFICE.

JAMES W. H. SNELL, OF DETROIT, MICHIGAN.

MACHINE FOR INSTALLING AND REMOVING TIRES FROM RIMS.

Application filed March 26, 1920. Serial No. 368,926.

*To all whom it may concern:*

Be it known that I, JAMES W. H. SNELL, citizen of the United States, residing at Detroit, county of Wayne, State of Michigan, have invented a certain new and useful Improvement in Machines for Installing and Removing Tires from Rims, and declare the following to be a full, clear, and exact description of the same, such as will enable others skilled in the art to which it pertains to make and use the same, reference being had to the accompanying drawings, which form a part of this specification.

My invention relates to a machine for installing upon vehicle rims or removing therefrom cushion or "airless" tires enclosed in the usual outer casing of a pneumatic tube.

This machine is designed especially for garage use and its object is to provide means whereby one man may exert a relatively high pressure of approximately sixty tons, in order that a "clincher" or other tire may be installed upon the rim of a vehicle wheel or demounted therefrom as may be required.

With the foregoing and other objects in view which will appear as the description proceeds the invention resides in the combination and arrangement of parts and in the details of construction hereinafter described and claimed,—it being understood that changes may be made in the precise embodiment of the invention herein disclosed without departing from the spirit of the same.

In the accompanying drawings forming part of this specification:—

Figure 1 is a plan view of the machine showing a tire installed upon a "clincher" rim.

Figure 2 is a vertical cross-sectional view through the machine showing the pulling hooks, pivoted to the draw-plate, in the position occupied when forcing the bead of the tire under the flange of the wheel rim, and also in dotted lines the position of the hooks when the work is completed ready for the removal of the rim and tire from the machine.

Figure 3 is an inverted plan view of the draw-plate, showing the tangentally arranged stiffening ribs and the pockets for receiving the operating lever for manually rotating the draw-plate.

Figure 4 is a vertical cross-sectional view through the machine showing the pulling hooks engaging the tire for the purpose of removing the tire from the rim,—and in dotted lines the position of the pulling hooks and draw-plate when the tire is forced from the rim.

Figure 5 is a detail plan view of the demounting rim, shown in section in the preceding view.

Figure 6 is a vertical cross-sectional view through the machine, indicating a sectional or divided compression ring applied to a "straight side tire" and the manner of installing tires of the "straight side" type upon a suitable rim.

Figures 7, 8, 9, 10, 11 and 12 are fragmentary vertical sectional views through the "floating table" showing the successive steps taken in installing a "straight side" tire upon a continuous rim.

Referring now to the letters of reference placed upon the drawings:—

A, denotes a base plate. A' is an upstanding screw-shaft which serves as a supporting pedestal for a "floating" table B, rotatable on the end of the screw-shaft and having a limited tilting movement thereon. A² denotes a suitable roller or ball thrust bearing on the end of the screw shaft A'. A³ is a disc flat on its underside to adapt it to rest upon the roller or ball thrust bearing, and having an arc-shaped top to conform to the end of the socket on the underside of the floating table B. A⁴ is a flange carried by the screw to limit the tilting action of the floating table.

C, indicates a circular "draw-plate" screwed upon the screw shaft A', and provided on its underside with a plurality of tangential ribs C' extending outwardly from the hub of the plate. C² denotes a plurality of pockets adapted to receive the end of a lever D for manually rotating the plate whereby it may be raised and lowered upon the screw-shaft A'.

E, designates a plurality of hooks pivoted to the draw-plate C in spaced relation to each other arranged in a circle concentric to the screw shaft.

The hooks E project through slotted radial arms B' which are integral with the central or "hub" portion of the floating table. The hooks E are formed with a cam-shaped back e, designed to cooperate with an adjustable hinged plate E', bolted to each of the slotted radial arms B'. These hinged plates carry rollers E², and are adapted to force the hooks inwardly, or toward the rim F of a vehicle wheel resting upon a mounting ring G,—grooved on each side as indicated at G' and G² to receive rims of different diameters. The ends of the hooks are each provided with short laterally extending arc-shaped blades E³, adapted to bear upon the outer casing H of the tire H' lodged therein, to compress the tire that the bead of the outer casing may enter beneath the flange of the vehicle rim for engagement thereby.

The floating table B is provided with a central recess B' on its upper face to receive the hub portion of the wheel on which the tire is mounted. B² denotes a plurality of upstanding "locating" pins set in the floating table to properly register the mounting ring G, and to secure the ring against displacement.

It will be assumed that the tire shown in Figure 2 of the drawing is what is known as a 30" x 3½" or 31" x 4" and in order to put on a 30" x 3" which is of less diameter than the said tires it will be necessary to locate a "spacing ring" not shown under the mounting ring G, so that when the latter is turned over to mount a tire from the other side of the latter, a proper cam action of the pulling hooks may be obtained.

Referring to Figure 2, I denotes a pilot cone mounted over the wheel rim to guide the tire over the rim. The cone ring fits against the exterior of the rim of the tire and it is also provided with means for engaging the rim interiorly thereof so that the pilot ring will be firmly mounted in position on the rim.

To mount a clincher tire on the rim, the mounting ring G is placed upon the floating table, being properly centered and secured against displacement by the "locating" pins B². The wheel rim F is then placed in the groove G² of the ring G, and the pilot cone I mounted on the rim as shown in Figure 2 of the drawings;—the draw-plate C and hooks E, being initially in the position indicated by dotted lines, to admit the ready placement of the wheel rim and tire. The hinged plates E' are then swung to the position shown in full lines that the rollers E² may cooperate with the cam-shaped back of the hooks to force the latter inwardly upon lowering the draw plate C by the manual operating of the lever D when inserted in one of the several pockets C² provided in the plate to receive it. The tire is thus compressed and its bead forced under the flange of the wheel rim. It will be noted that a limited tilting action of the "floating" table is provided, this is essential for two reasons,—first: in order to avoid the stretching of the bead or clincher tires, as it permits the tire to tilt so that certain of the hooks may pull to a greater extent than the others,—and upon the table striking the flange A⁴ on the screw shaft A' it is forced back to a horizontal position whereupon the remaining hooks become effective to force down the tire and thereby complete the operation of mounting the tire upon the rim. Second: it acts as an equalizer causing every hook to perform the same amount of work, regardless of any vulcanized spots in the casing which might otherwise throw the "work" on a few of the hooks, thereby causing the machine to operate improperly.

The hooks are shaped at the back with a "slow and fast cam" so that when the hooks reach a certain position in their operation they will move toward the center of the machine, giving a timed inward feed,—one hook tucking the bead under the flange of the clincher rim,—the others automatically following due to the tilting action of the table:—all of the hooks operating before the table completes a full revolution to tuck its portion of the tire bead under the rim,—the job is thus completed.

To take off a clincher tire I provide a collapsible demounting rim J,—see Figures 4 and 5,—grooved in like manner to the mounting rings, the ring however being relatively wider to provide for pulling the tire off the rim.

To remove the tire the rim is mounted upon the collapsible demounting ring J,— the bead of the tire is then pulled out of the flange on one side through the operation of the pulling hooks as when mounting the tire. The rim is then turned over on the collapsible ring J and the pulling hooks again placed in position as before. The draw-plate C is then actuated by means of the lever D, thereby pulling the tire downwardly upon the demounting rim as shown in dotted lines in Figure 4, leaving the empty rim on top of the demounting ring.

The demounting ring is constructed in two parts as shown in Figure 5, which readily falls apart upon lifting it from the body of the machine leaving the tire free and ready for remounting.

In mounting straight side tires it is necessary to make a straight vertical pull or press, therefore the hinged plates E' are swung back as indicated in Figure 6, and Figures 7 to 9, in order that the rolls E² of the hinged plate may not act upon the cam-face back of the pulling hooks.

A ring K, preferably constructed in four parts, is first placed upon the tilting table,— the tire L is then laid upon the ring and a similar divided ring K' is laid upon the tire as shown in Figure 6 of the drawing. These rings are shaped to fit the tire and have a groove K² to receive the laterally projecting wings of the pulling hooks.

The draw plate C is then revolved as before and the tire is thus compressed sufficiently to place the split rim or ring M,—see Figure 6, in position.

In Figures 7 to 12 are shown what is generally known as a "universal rim":—In this case a divided mounting ring U is placed on the floating table and the rim V mounted thereon as previously described. A ring W, is now placed in position upon the tire, as shown in Figure 9, and the pulling hooks caused to engage the ring, as shown in Figure 10,—compressing the tire; the rim X is then placed in position and the locking ring Y inserted as shown in Figure 11; the tire is then released so it may lodge beneath the rim; the pulling hooks are then removed, as shown in Figure 12.

Having thus described my invention what I claim is:—

1. In a machine of the character described, a screw-shaft, means for supporting the shaft, a floating rotatable table mounted on the end of the shaft, adapted to receive and support a vehicle rim and tire, a vertically movable draw-plate adapted to traverse said shaft and rotatable simultaneously with the said table, a plurality of hooks designed to engage a tire supported upon said table, said hooks being pivoted to said draw-plate, whereby upon raising or lowering the latter the hooks may act upon the tire to install or remove it from the rim.

2. In a machine of the character described, a screw shaft, means for supporting the shaft, a floating rotatable table mounted upon the end of the screw shaft and provided with slots and adapted to receive and support a vehicle rim and tire, a vertically movable rotatable draw-plate screwed upon said shaft, a plurality of hooks extending through the said slots in the floating rotatable table and adapted to engage a tire to install or remove the same from its rim, said hooks being pivoted to the rotatable draw-plate, and means for rotating said draw-plate simultaneously with the table.

3. In a machine of the character described, a screw shaft, a floating rotatable table mounted upon the end of said screw shaft, said table having slots therein, a vertically movable rotatable draw-plate screwed upon the shaft, a plurality of hooks pivoted to the rotatable draw-plate extending upwardly through said slots in said floating rotatable table, and means for manually rotating the draw-plate and table simultaneously, whereby the hooks may be raised or lowered with reference to said floating rotatable table.

4. In a machine of the character described, a screw-threaded pedestal, a thrust anti-friction bearing mounted on the end of said pedestal, a floating rotatable table mounted on the end of said thrust bearing and having slots therein, a vertically movable draw-plate screwed upon said pedestal provided with pockets adapted to receive an operating lever, a lever for rotating said draw-plate, and a plurality of hooks pivoted to said draw-plate and extending up through the said slots in the rotatable table, whereby they may be adapted to mount or remove a tire supported upon said rim.

5. In a machine of the character described, a screw-threaded pedestal, a rotatable tiltable table mounted on the end of said pedestal and having slots therein, means for limiting the tilting action of the table, a vertically movable draw-plate screwed upon said pedestal, means for rotating said draw-plate, a plurality of hooks pivoted to said draw-plate and extending up through the said slots in the rotatable table, whereby they may engage a tire to be mounted upon or removed from the rim.

6. In a machine of the character described, a screw shaft, means for supporting the shaft, a rotatable tiltable table mounted on the end of said shaft, said table having slots therein, a plate carried by the shaft to limit the tilting action of the table, a draw-plate screwed upon the shaft, a plurality of pulling hooks pivoted to the draw-plate extending upwardly through the said slots in the tiltable table and having cam-shaped backs, a plurality of adjustable hinged plates bolted to the tiltable table, and rollers journaled in said plates adapted to traverse the cam-back of the pulling hooks to force the latter inwardly when drawn downwardly through the operation of the draw-plate.

7. In a machine of the character described, a screw-shaft, a rotatable tiltable table mounted upon said shaft having radial slotted arms, a draw-plate screwed upon the screw shaft, means for rotating the draw-plate, a plurality of pulling hooks pivoted to the draw plate and respectively projecting through the several slotted arms of the tiltable table, the backs of said pulling hooks having a cam-face, adjustable means supported by each of the arms of the tiltable table adapted to act upon the cam-face of the hooks to force the latter inwardly when required, as the hooks are drawn downwardly by the operation of the draw plate.

8. In a machine of the character described, a screw shaft, means for supporting said shaft, a floating rotatable table connected to the shaft and adapted to receive and support a vehicle rim and tire, a member having connection with the shaft and movable along the latter and rotatable simultaneously with the table, a plurality of devices pivotally connected to the said member and adapted to engage a tire supported upon the table whereby upon movement of said member along the shaft the hooks may act upon the tire to install or remove it from the rim.

9. In a machine of the character described, a screw shaft, means for supporting the shaft, a rotatable table mounted on the end of the shaft for the reception and support of a vehicle rim and tire, a vertically movable draw plate adapted to traverse said shaft and rotatable simultaneously with the table, a plurality of hooks pivotally mounted upon the draw plate and adapted to engage a tire supported upon said table, and means whereby upon raising or lowering the draw plate the hooks are constrained to act upon the tire to install or remove it from the rim.

10. In a machine of the character described, a screw shaft, means for supporting the shaft, a rotatable tiltable table mounted on the end of the shaft, a vertically movable rotatable draw-plate screwed upon the shaft, stiffening ribs integral with the body of the draw-plate extending outwardly at a tangent to its hub, a plurality of hooks extending through slots in the rotatable tiltable table pivoted to the draw-plate, and means for rotating the draw-plate.

In testimony whereof, I sign this specification in the presence of two witnesses.

JAMES W. H. SNELL.

Witnesses:
S. E. THOMAS,
JOSEPH A. ROSENBERGER.